Feb. 23, 1971 H. J. KLAEUI 3,564,872
APPARATUS FOR SUPPLYING PARALLEL LENGTHS OF FIBROUS MATERIAL
Filed March 13, 1969 8 Sheets-Sheet 1

INVENTOR
HANS J. KLAEUI

BY *Howard H. Horner Jr.*

ATTORNEY

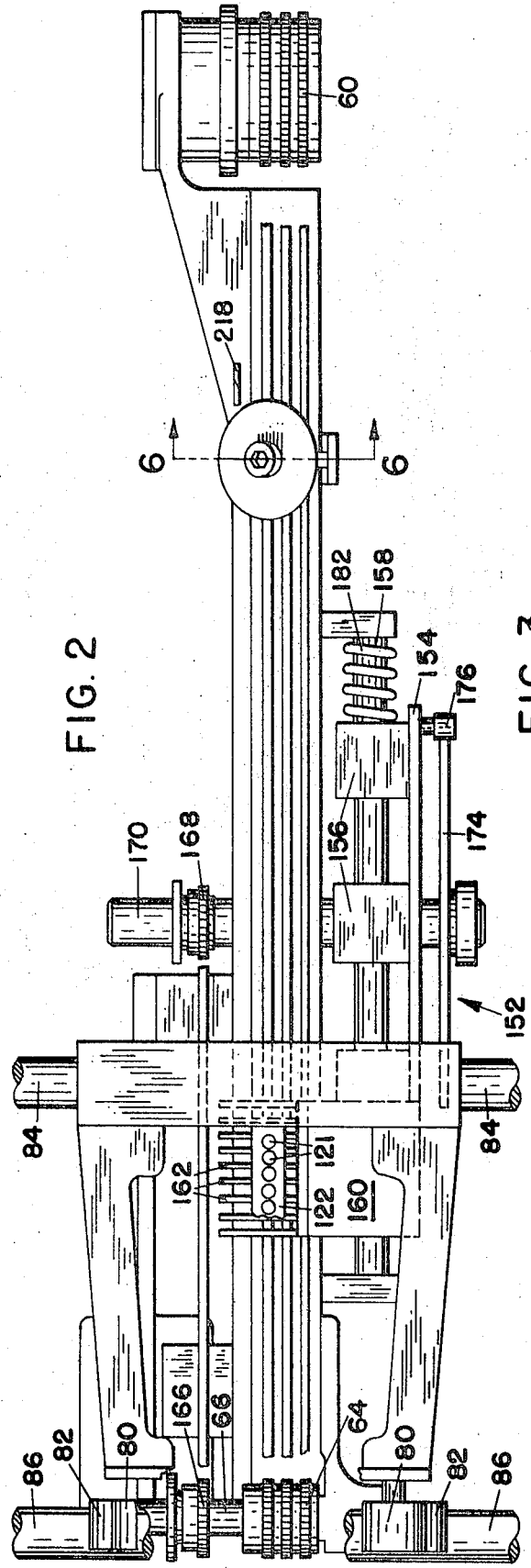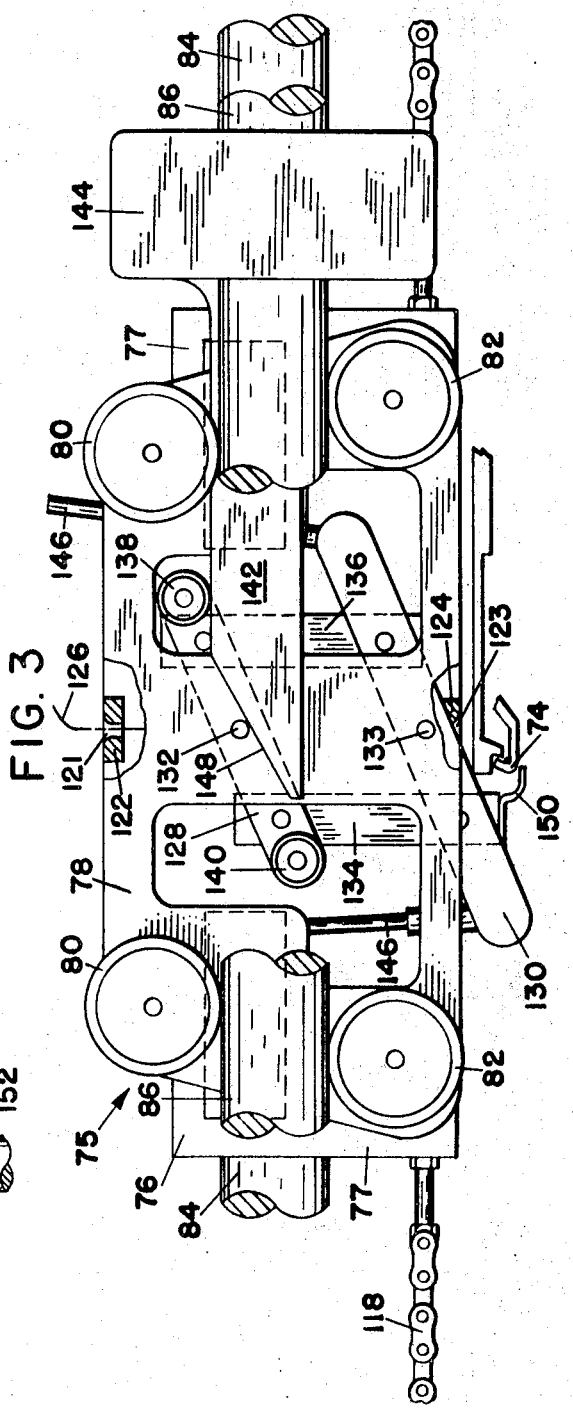

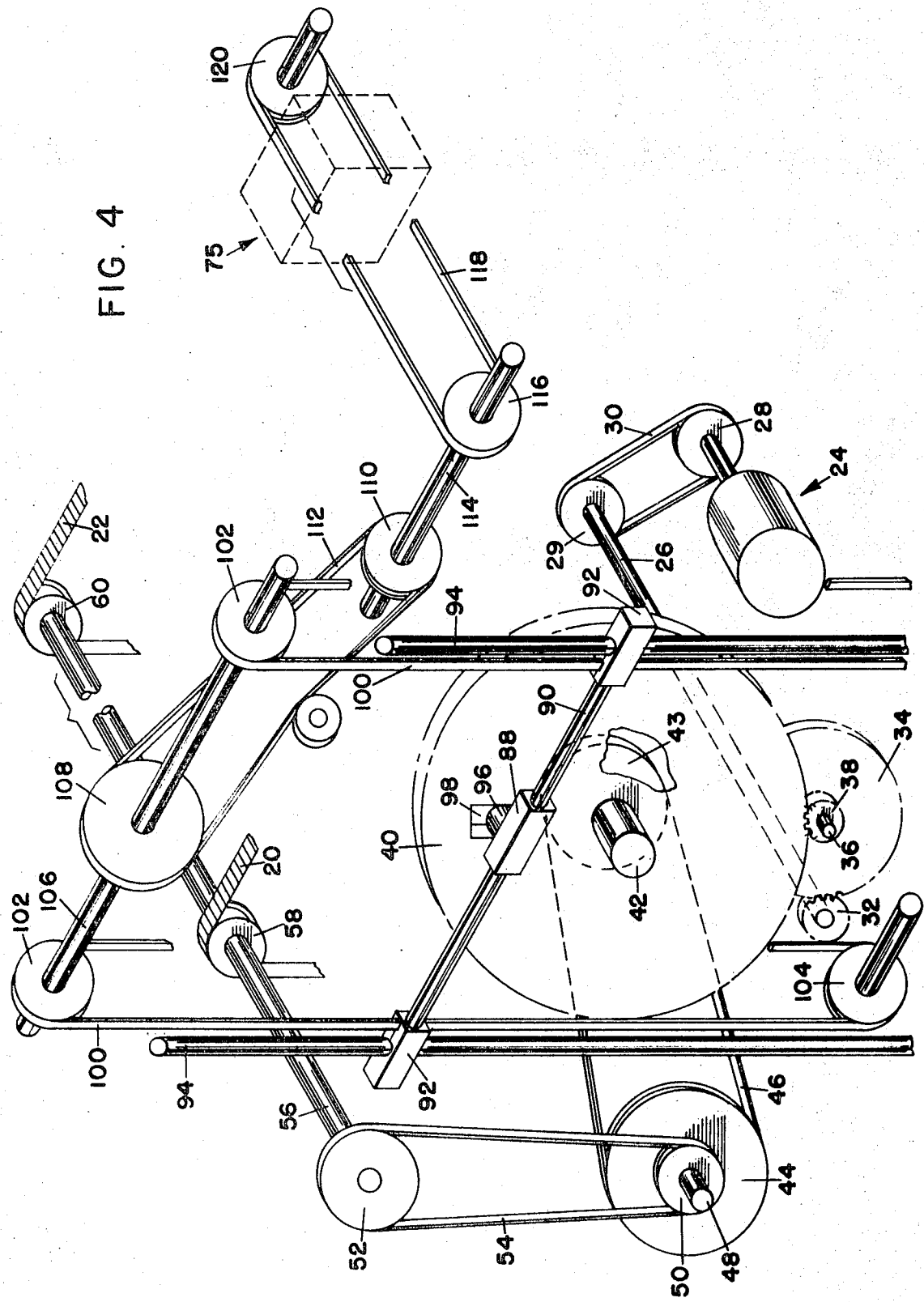

INVENTOR
HANS J. KLAEUI
BY Howard G. Garner Jr.
ATTORNEY

Feb. 23, 1971 H. J. KLAEUI 3,564,872
APPARATUS FOR SUPPLYING PARALLEL LENGTHS OF FIBROUS MATERIAL
Filed March 13, 1969 8 Sheets-Sheet 5
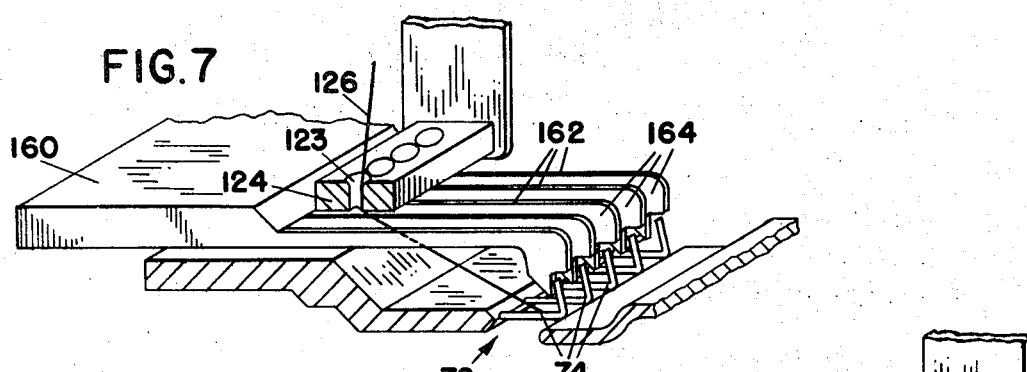
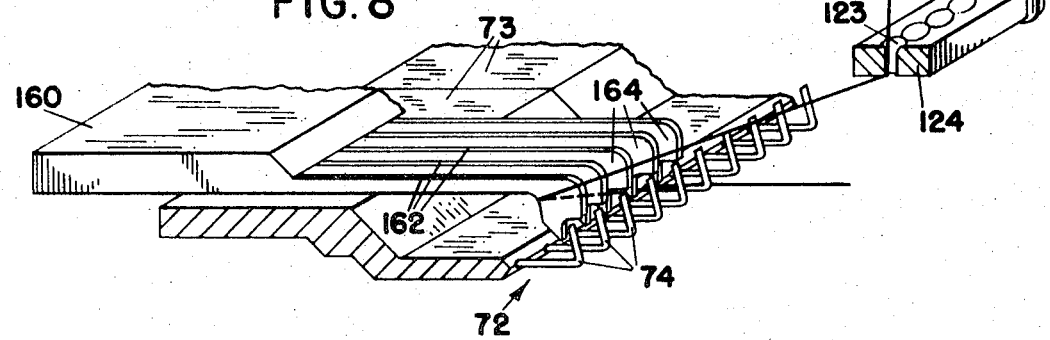
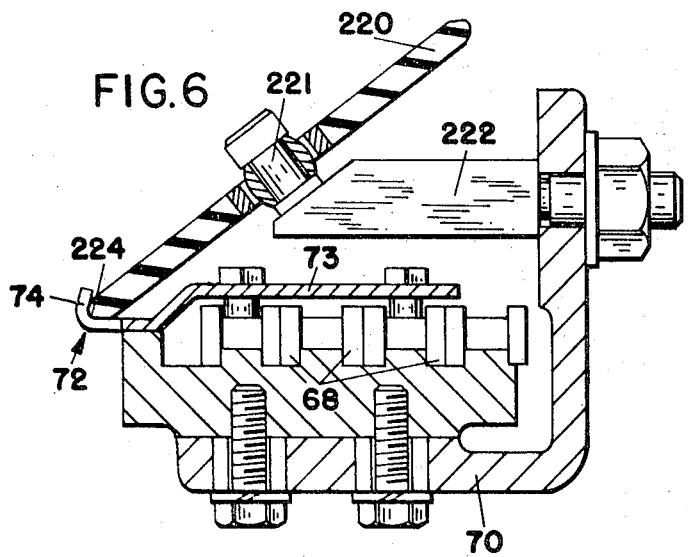
INVENTOR
HANS J. KLAEUI
BY *Howard H. Garner jr.*
ATTORNEY

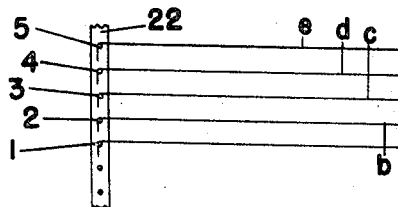
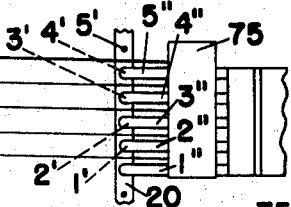
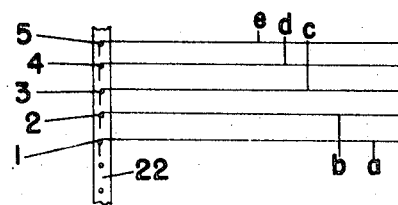
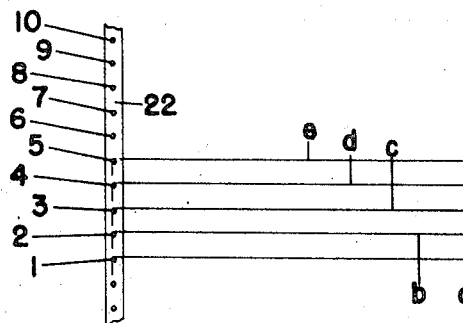
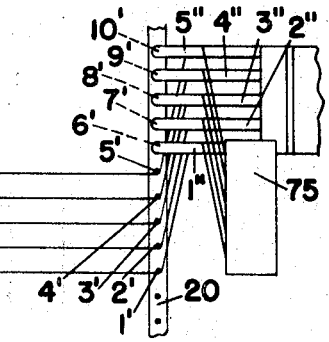
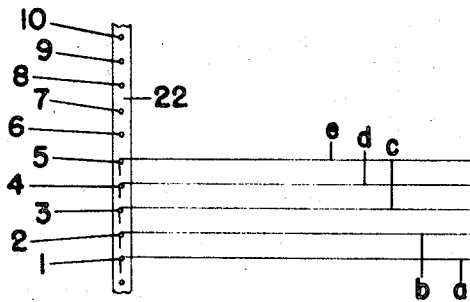
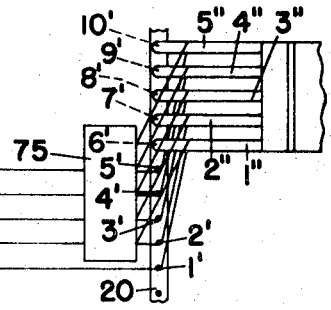
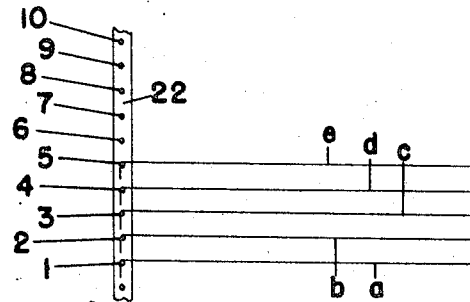
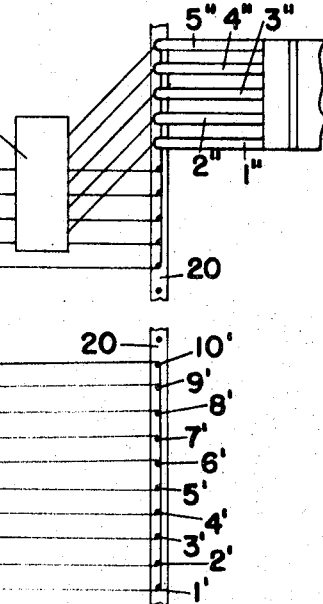
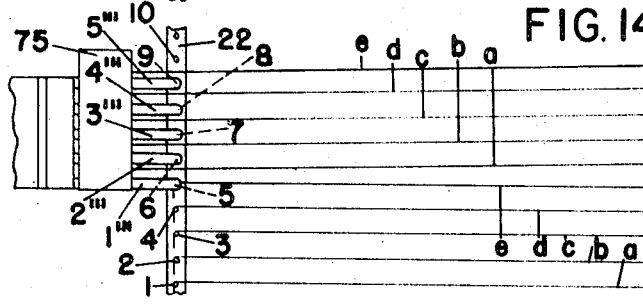

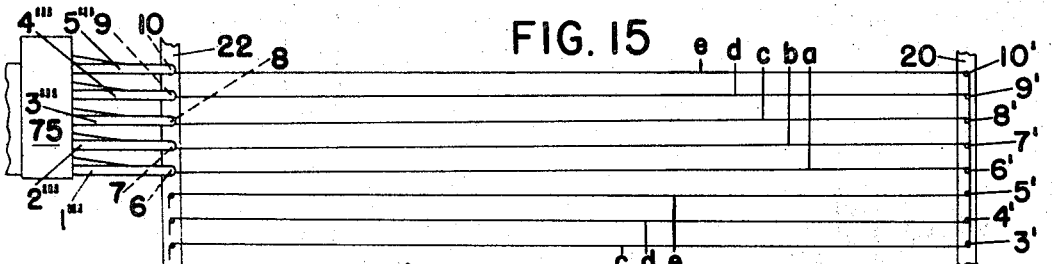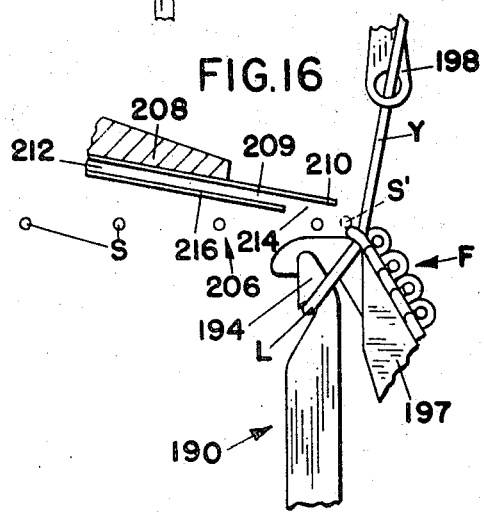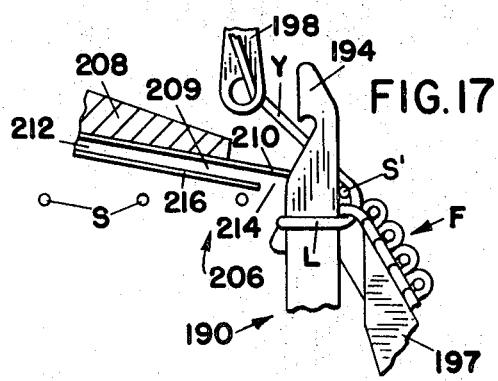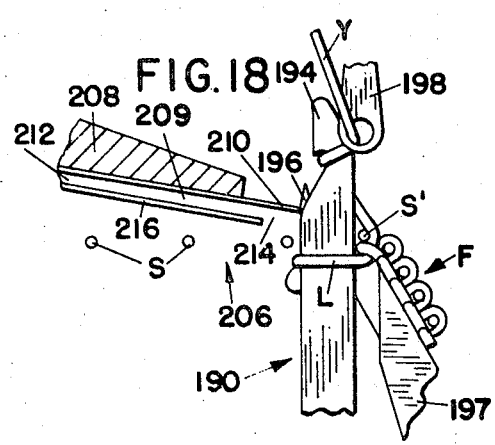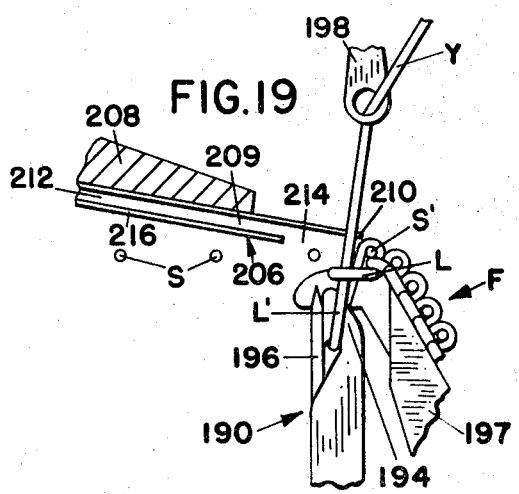

United States Patent Office 3,564,872
Patented Feb. 23, 1971

3,564,872
APPARATUS FOR SUPPLYING PARALLEL LENGTHS OF FIBROUS MATERIAL
Hans J. Klaeui, Charlotte, N.C., assignor to Crompton & Knowles Corporation, Worcester, Mass., a corporation of Massachusetts
Filed Mar. 13, 1969, Ser. No. 806,948
Int. Cl. D04b 23/12
U.S. Cl. 66—85                               14 Claims

ABSTRACT OF THE DISCLOSURE

A machine for supplying parallel lengths of fibrous strands for incorporation in a non-woven fabric. A guide carriage reciprocates between a pair of continuously moving conveyors having strand engaging hooks. The carriage lays a band of strands, first around a set of hooks of one conveyor and then a set of hooks on the other conveyor. Before each crossing of the carriage, a rake adjacent each conveyor extends each strand, relative to the conveyor, a distance of one band width from a first holding element to a second holding element upstream of the same conveyor. The carriage, rake, and conveyors are operated in timed relation so that the lengths of strands extending between conveyors will all be parallel for presentation to fabric forming means.

BACKGROUND OF THE INVENTION

This invention relates to a machine for supplying parallel lengths of fibrous strands to non-woven fabric forming machinery such as a warp knitting machine. Although the invention is disclosed in combination with a warp knitting machine, other fabric forming means could be utilized as well. The parallel strands produced by the present invention could be chemically or thermally bonded to a web for example.

There are numerous machines for producing fabric composed of parallel strands, some of which bind the strands with knitted chains of warp thread loops. In most cases, the problems of arranging the filling in parallel lengths severely limits the speed of the machine. The following patents are examples of the various approaches which have been taken to produce knitted fabric having parallel filling strands: J. Morton, U.S. Pat. 1,946,030 and U.S. Pat. 2,000,643; I. Springthorpe, U.S. Pat. 1,661,005, British Pat. 223,342, and British Pat. 281,048. Other patents show machines for laying parallel filling strands which are held together by means other than knitting. Examples of the latter type of machine are shown in U.S. patents to R. A. Havemann, 2,954,817; L. R. Willman, 3,156,027; C. H. Howard et al., 1,518,512; C. C. Wilson et al.; A. B. Stevenson, 2,936,022; and J. M. Diehl, 3,041,230.

As far as is known, none of the prior art machines which feed parallel strand lengths to a knitting machine can lay the strands in parallel lengths with enough speed to match speeds of modern fabric forming machinery. This speed limitation is due to the limited number of strands which are simultaneously handled by the strand inserting mechanism of each of the prior art machines.

The machines other than the knitting machine illustrated in the above-mentioned patents, which show the insertion of wide bands of strands, have other drawbacks. The strand lengths have to be cut after insertion of each band or sheet of strands. Control and accuracy of spacing of strands to be presented to the fabric forming means is therefore a problem.

A machine has been developed which can insert strands at high speeds which match or exceed the speed of most fabric forming machines. This type of machine is illustrated in U.S. Pat. to Mauersberger Re. 25,749. Mauersberger lays a band of strands between two continuously-moving conveyors which have respective sets of strand holding elements. A carriage, reciprocally movable above the conveyors, brings the band from one conveyor to the other. The strands are alternately laid about respective holding elements, first on one conveyor and then on the other. The conveyors continue to advance toward a row of knitting needles where the strands are incorporated into a knitted fabric. Each strand in a band is parallel to the strands in the same band but each band is disposed at an angle to preceding and subsequent bands. The inserted strands are fed to the knitting needles as a multi-layer system of superimposed and intersecting zigzag filling stretches. A distinguishing feature of the machine made according to the Mauersberger patent is its ability to produce a warp knit fabric at extremely high speeds. The fabric so produced is also distinguished by the overlapping zigzag layers of strands.

SUMMARY OF THE INVENTION

It is a principal object of the present invention to provide a machine for supplying parallel lengths of strands for incorporation in a non-woven fabric at a high rate of speed with maximum control of the strands.

A further object of the invention is the provision of a means to present parallel strands to a straight bar knitting machine at a uniform rate.

The objects of the invention are realized by a strand inserting machine which is similar in construction and operation to that disclosed in Mauersberger, supra. The invention comprises a pair of spaced conveyors and a carriage like that shown in Mauersberger, supra, with the addition of a rake over each conveyor for shifting the band of strands each time the strands are inserted in respective holding elements on a conveyor by the carriage. The strands are extended by the rake to a second set of holding elements before each crossing of the carriage, each strand being shifted approximately a distance of one band width. The strands are transferred from the rake to the second set of holding elements as the carriage returns to the other conveyor, whereupon a similar strand extending cycle is performed. Drives for the conveyors, rakes, and carriage are operatively connected so that the conveyors advance two band widths for each reciprocation of the carriage so that the rakes operate to shift the band in the proper timed relation as described above. The strands which are inserted in the manner described above are therefore advanced toward the fabric forming machinery as a continuous sheet of parallel strands.

As a special application of the invention to a knitting machine, the distance between each holding element is considerably greater than the stitching length of each knitting loop. The conveyors are therefore advanced toward the knitting needles at a greater speed than that at which the fabric is produced. This difference between conveyor and fabric speed makes it necessary to remove the strand lengths from the holding elements immediately after they are incorporated into the fabric. Since each strand extends from one band of holding elements to adjacent bands, the removal of one strand length from its holding element would cause its corresponding length in the next band to become slack. For this reason, strand retaining means are provided to hold the portion of each strand which extends between bands until the lengths of each consecutive band of strands are securely enmeshed by knitting loops.

In the application of the invention to a knitting machine, fabric uniformity is maintained by the provision of strand presenting means which includes a plurality of orifices situated in front of the knitting needles on the conveyor side. The orifices are spaced from the knitting needles at a distance which is less than the spacing between holding elements. Air is directed from the orifices generally toward the needles and blows each filling length against the warp knitting yarns extending between the knitting needles and the usual guide bar. The strand length which is blown by the orifices will also be located between the cloth and the row of knitting needles as the needles move outwardly to pick up their respective knitting yarns. As the knitting needles move inwardly, a knitting loop will be formed around the last positioned strand length.

BRIEF DESCRIPTION OF THE DRAWINGS

Other objects and advantages will be evident from the following description in conjunction with the drawings in which:

FIG. 2 is a plan view of one side of the mechanism shown in FIG. 1;

FIG. 3 is a rear elevation looking in the direction of arrow 3 in FIG. 2, with parts broken away and showing the carriage in position to deposit strands between holding element on one of the conveyors;

FIG. 4 is an isometric view of the carriage and conveyor drives;

FIG. 6 is a fragmentary section on line 6—6 of FIG. 2, showing the hold-down wheel;

FIG. 7 is a fragmentary isometric view looking from the rear of the machine and showing the carriage in the process of laying a plurality of strand lengths between holding elements on the right hand conveyor;

FIG. 8 is a view similar to FIG. 7 showing the carriage as it begins to move to the left hand conveyor and the rake as it extends the previously layed strands from a first set of holding elements to a second set of holding elements on the left hand conveyor;

FIG. 9 is a diagrammatic view of the strand laying operation, showing the carriage as it approaches the extreme right in the process of inserting strand lengths between holding elements of the right hand conveyor;

FIG. 10 is a view similar to FIG. 9, showing the carriage at the extreme right of its reciprocating travel;

FIG. 11 is a view similar to FIG. 9, showing the rake extending the lengths of strands between the right hand conveyor and the carriage;

FIG. 12 is a view similar to FIG. 9, showing the carriage as it begins to cross over to the left hand conveyor;

FIG. 13 is a view similar to FIG. 12, showing the carriage at the point in its travel when the strand lengths disengage from the extending means and are engaged by a second set of holding elements on the right hand conveyor;

FIG. 14 is a view similar to FIG. 9, showing the carriage as it approaches the extreme left in the process of inserting strand lengths between holding elements of the left hand conveyor;

FIG. 15 is a view similar to FIG. 10, showing the carriage at the extreme left of its reciprocating travel;

FIGS. 16–19 are diagrammatic operational views of knitting apparatus by which parallel strands supplied by the present invention are supplied to the knitting apparatus for incorporation into a knitted fabric structure.

DETAILED DESCRIPTION

(A) Conveyor and conveyor operating means

Figure 1:
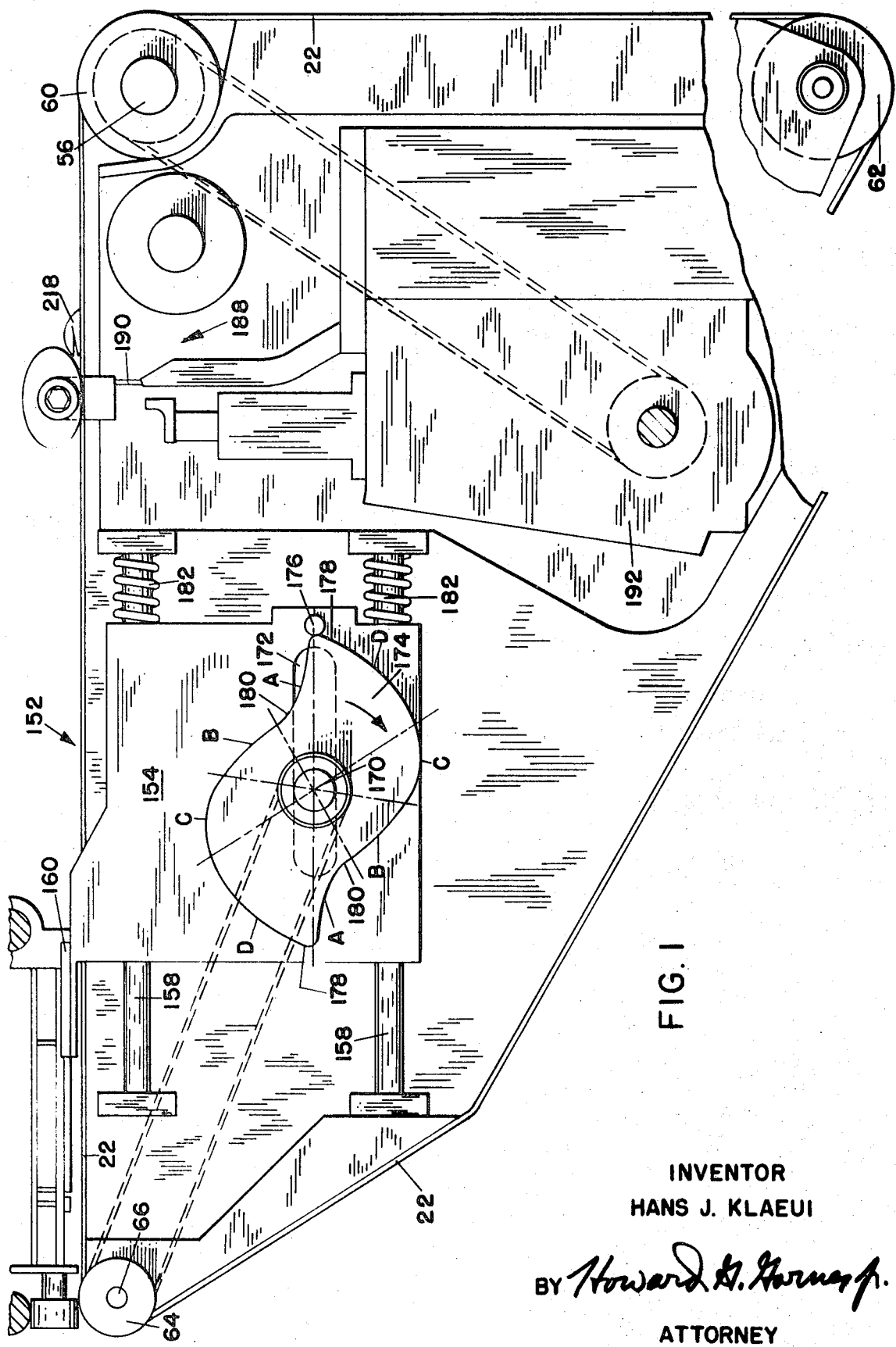
FIG. 1 is a side elevation of the strand laying means of the present invention in connection with a knitting machine, showing the interconnected drive relation of the strand extending means and conveyors.

Referring particularly to FIGS. 1 and 4, there is a pair of endless right and left hand conveyors indicated at 20 and 22, respectively. As seen in FIG. 4, a motor generally indicated at 24 drives a shaft 26 through a pair of sprockets 28 and 29 and a chain 30. A small gear 32 is fixed to shaft 26 and drives a larger gear 34 fixed to a stub shaft 36. A small gear 38 is also fixed to shaft 36 and drives a very large gear 40 which is fixed to a second stub shaft 42. A sprocket 43 is fixed to shaft 42 and drives a sprocket 44 through a chain 46. Sprocket 44 is fixed to a shaft 48 to which is also attached a smaller sprocket 50 which drives still another sprocket 52 by a chain 54. Sprocket 52 is fixed to a shaft 56 on which is fixed a pair of conveyor sprockets 58 and 60 which drive previously described conveyors 20 and 22 respectively. As can be seen by the relative sizes of the gears and sprockets in FIG. 4, there is a considerable reduction in speed from the motor to the conveyors 20 and 22. The conveyor drive shown in FIG. 4 is an example of any number of speed reducing combinations which could be used.

Referring to FIG. 1, the left hand conveyor 22 extends from sprocket 60 around a lower idler sprocket 62, around an upper idler sprocket 64 which is fixed to a shaft 66 and back to sprocket 60. The right hand conveyor is arranged around a similar set of idler sprockets on the other side of the machine.

Referring to FIGS. 2, 3, and 6, conveyor 22 consists of a plurality of conveyor chains which are guided in grooves 68 in a guide plate 70 extending from idler sprocket 64 to sprocket 60. There is a plurality of holding elements generally indicated at 72 which are located at spaced intervals along the entire conveyor span. The holding elements 72 are supported in bar sections 73 which are fixed to pairs of conveyor chains at two points to stabilize the holding element crosswise of the conveyor. Each holding element 72 has an upwardly extending strand engaging hook portion 74. Conveyor 20 is exactly the same as conveyor 22 and has the same type of holding element 72. The element 72 on conveyor 20 extends to the inside of conveyor 20 and extends toward holding elements 72 on conveyor 22.

(B) Strand carriage and carriage operating means

Referring to FIGS. 2, 3, and 4, the strand carriage is generally indicated at 75. The carriage has a forward wall 76 which is formed into a pair of bearing members 77 and a rearward wall 78 on which are supported upper and lower guide rollers 80 and 82 respectively. Bearing members 77 are slidably mounted on a forward guide shaft 84 and rollers 80 and 82 will roll on a rearward guide shaft 86 located therebetween. Shafts 84 and 86 extend from the right and left hand edges of the machine just over the conveyors.

Referring particularly to FIG. 4, the drive for the carriage is transmitted from previously described gear 40. A block 88 is horizontally slidable on a cross shaft 90 which is supported by a pair of blocks 92 which are vertically slidable on a pair of vertical rods 94. A follower 96 is attached to block 88 and is trapped within a groove 98 in gear 40. Rotations of gear 40 will displace shaft 90 and block 88 vertically and cause blocks 92 to slide vertically on rods 94. Since follower 96 will be moved in a circular path by gear 40, it will also have a horizontal displacement. This horizontal displacement of follower 96 will cause block 88 to slide on shaft 90. The resulting motion of blocks 92 will be harmonic. There is an endless chain 100 attached to each block 92 and trained around upper and lower sprockets 102 and 104 respectively. Upper sprockets 102 are fixed to an upper cross shaft 106 which extends between the sprockets 102. A sprocket 108 is also fixed to shaft 106 and drives a sprocket 110 through a chain 112. Sprocket 110 is fixed to a shaft 114 to which is fixed another sprocket 116. A chain 118 is trained around sprocket 116 and an idler sprocket 120. Chain 118 is fixed to the lower bearing portions 77 of the back wall 76 of the carriage, see FIG. 3. For each rotation of gear 40, each block 92 will reciprocate between an upper and lower vertical position and cause the carriage 75 to reciprocate between sprockets 116 and 120 which are located to the outside of conveyors 20 and 22 respectively.

The strands which are to be deposited between conveyors 20 and 22 extend from supply packages, not shown, through guide holes 121 in an upper guide rail 122 which extends between the front wall 76 and the rear wall 78 of the carriage. The strands extend from guide rail 122 through guide holes 123 in a lower guide rail 124 located at the bottom of the carriage. The strands extend through the carriage in a path indicated by the dot and dash lines 126.

To insure a faultless insertion of the individual strands between respective hooks 74, the strands must be brought below the plane of the hooks when the carriage reaches the end of its travel with respect to each conveyor. For this purpose, two parallel two-armed levers 128 and 130 are pivotally mounted at 132 and 133 respectively on wall 78 of the carriage. Levers 128 and 130 are normally disposed in a horizontal direction and are connected through a pair of vertical links 134 and 136. As seen in FIG. 3, the left hand arms of links 128 and 130 are pivotally connected to links 134 at spaced points. The right hand arms of links 128 and 130 are pivotally connected to link 136 at spaced points. Two rollers 138 and 140 are journalled to the right and left ends respectively of lever 128. A cam 142 extends from a support 144 into the path of rollers 138 and 140. A pair of upright balance rods 146 attached to the respective ends of lever 130 maintain levers 128 and 130 horizontal. As the carriage approaches the end of its motion to the right, roll 138 engages an inclined portion 148 of cam 142 and rocks levers 128 and 130 counterclockwise. As seen in FIG. 3, roll 138 has engaged incline 148 and has made its way to the top of cam 142. Link 134 is therefore in its lowest position. Attached to the lower portion of link 134 is a presser bar 150 which is lowered to a point below the hooks 74. The strands extending from the conveyor on the opposite side of the machine and along the path indicated by dot and dash line 126 are pressed between the hooks of respective holding elements. Roller 140 engages a similar cam 142 when the carriage moves to the other side of the machine. When the carriage nears the end of its motion toward the side opposite that shown in FIG. 3, roller 140 will be raised thereby rocking levers 128 and 130 clockwise and lowering link 136. A presser bar 150 is also attached to the bottom of link 136 for depressing the strands and insuring that the strands will be inserted between respective holding elements on conveyor 20.

(C) Rake and rake operating means

Referring particularly to FIGS. 1, 2, and 3, each side of the machine is provided with a rake generally indicated at 152. Each rake has a main body portion 154 supported by a pair of bearing members 156 which are slidably supported on a pair of horizontal cylindrical rods 158. A horizontal plate 160 extends from the main body portion of the rake over the holding elements 72 and supports a series of horizontal tines 162 which have downwardly extending projections 164, see FIGS. 7 and 8. The spacing of the projections 164 is the same as it is between holding element 72.

The operating means for the rake is illustrated in FIGS. 1 and 2. As seen in those figures, a sprocket 166 is fixed to previously described shaft 66. Sprocket 166 drives a sprocket 168 fixed to a shaft 170 which extends through a slot 172 in the main body portion 154 of the rake and between rods 158. A rake cam 174 is fixed to the outer end of shaft 170 to the outside of portion 154. The operating surface of cam 174 engages a follower 176 journalled on portion 154 of the rake. Cam 174 makes one revolution for each reciprocation of the carriage and is therefore a two-phase cam. There is a high point 178 and a low point 180 for each phase of the cam so that each rake makes a complete operating cycle for each crossing of the carriage. One operating cycle will be effective to extend the strands, in a manner to be explained in more detail, when the carriage is adjacent one of the rakes, the other cycle of the same rake will be an idle one when the carriage is adjacent the other rake at the opposite side of the machine. As the follower is engaged by cam 174 progressively from the low point 180 to the high point 178, the rake is shifted forward or to the right as viewed in FIGS. 1 and 2 against compression springs 182 mounted on rods 158. Engagement of follower 176 from the high portion 178 to the low portion 180 of the cam 174 results in a relatively quick motion of the rake toward the rear of the machine or to the left as viewed in FIGS. 1 and 2. FIGS. 1, 2, and 3 show the rake and rake operating means which is associated with the left hand conveyor 22 but it is to be understood that the rake and rake operating mechanism associated with the right hand conveyor 20 is exactly the same as for conveyor 22.

(D) Operation of strand insertion

A typical strand laying cycle is illustrated in FIGS. 9–15. Referring particularly to FIG. 9, only 5 strands are depicted for simultaneous insertion while in actual operation as many as 100 strands may be inserted simultaneously. Five strands are illustrated for clarity and ease of following a typical strand laying cycle.

Figure 20:
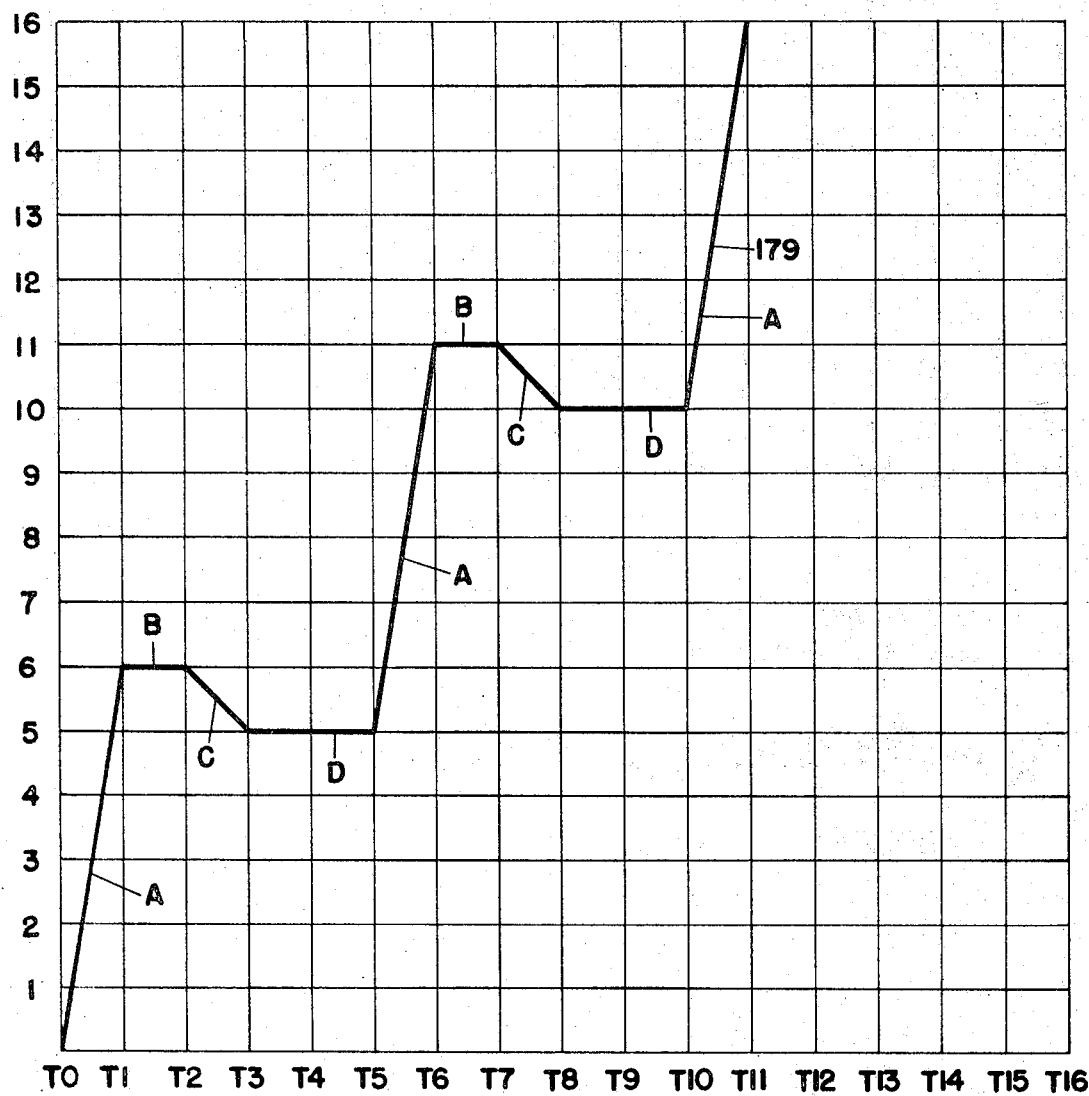
FIG. 20 is a timing diagram of the conveyor and strand extending means displacement for successive reciprocations of the carriage.

The relative motion of the rake to the conveyor is depicted in FIG. 20. In that figure, vertical coordinates represent hooks on the conveyor and the horizontal coordinates represent time intervals. The motion of the rake when plotted relative to the conveyor and time will form an irregular line indicated at 179. The time units T1, T2, etc. represent any convenient time units. For ease of understanding, the time units T1, T2, etc. represent the time that it takes for the conveyors to move a distance of one hook spacing.

The segments A, B, C and D of line 179 represent different movements of the rake relative to the conveyors. Referring to FIG. 1, the portions of cam 174 which correspond to the various segments of line 179 are identified accordingly. For example, the portion of cam 174 which extends from high point 178 to low point 180 is identified as A to correspond to the motion of the rake as represented by segment A of line 179 in FIG. 20.

In FIG. 9, the carriage 75 is shown nearing the extreme position to the right toward the outside of conveyor 20. Strands a, b, c, d and e extend from the carriage from hooks 1, 2, 3, 4 and 5 respectively on conveyor 22 and will also lie in front of hooks 1', 2', 3', 4' and 5' respectively on conveyor 20 and behind tines 1'', 2'', 3'', 4'' and 5'' respectively of rake 152. The position of the carriage and rake as shown in FIG. 9 corresponds to that shown in FIG. 7. Corresponding tines 164 lie directly over hooks 1', 2', 3', 4' and 5'.

As the carriage reaches the extreme right-hand position as shown in FIG. 10, the rake begins to move rearwardly so that tines 1'', 2'', 3'', 4'' and 5'' engage strands a, b, c, d and e respectively. Continued rearward motion of the rake extends the portion of each strand which lies between the carriage 75 and its respective holding element. At the end of the rearward motion of the rake, the strands are extended a distance of one band width as shown in FIG. 11. This motion of the rake takes place as follower 176 moves from the high point 178 to the low point 180 of cam 174 along portion A of the cam. This motion is also represented by segment A of line 179 in FIG. 20. The actual rearward motion of the rake is five hook spaces from time interval T0 to T1. Since the conveyor moves continuously forward, it moves forward a distance of one hook space during the T0 to T1 time interval. Since the rake and conveyor move in opposite directions, the relative displacement between the rake and conveyor is therefore six hook spaces as seen in FIG. 20. The reason that the rake moves six spaces with respect to the conveyor instead of five is because it begins its rearward motion one hook spacing forward of the holding elements with which it would normally be aligned. This is to enable the carriage to deposit the strands behind the tines of the rake as shown in FIG. 9. How the rake gets to this forward position with respect to the conveyor will be described in greater detail hereinbelow.

The forward motion of the conveyor will cause the hooks 1', 2', 3', 4' and 5' to engage strands $a$, $b$, $c$, $d$ and $e$ respectively from FIG. 9 to FIG. 10. At the end of the rearward motion of the rake, the tines 1", 2", 3", 4" and 5" will be aligned with hooks 6', 7', 8', 9' and 10' respectively and the strands $a$, $b$, $c$, $d$ and $e$ will extend from hooks 1', 2', 3', 4' and 5' respectively as shown in FIG. 11.

The carriage 75 begins to move back to the left hand conveyor 22 during the rearward motion of the rake as shown in FIG. 11. The carriage 75 continues to move toward conveyor 22 past the hooks on conveyor 20 as shown in FIG. 12. The strands $a$, $b$, $c$, $d$ and $e$ still extend around tines 1", 2", 3", 4" and 5" respectively and hooks, 1, 2, 3, 4 and 5 respectively during this first portion of the carriage motion. FIG. 12 corresponds to FIG. 8 with respect to operating sequence.

After the rake has shifted to the position shown in FIG. 11, it begins to move forward again as follower 176 first begins to move from the low portion 180 to the high portion 178 of cam 174. This forward motion of the rake occurs as follower 176 moves along section B of cam 174 as represented by the line segment B in FIG. 20. As can be seen in FIG. 20, the displacement of the rake as represented by line segment B is at the same rate as that of the conveyor since there is no relative motion of the rake with respect to the conveyor during the time interval T1 to T2.

When the carriage has traversed approximately 10% of the distance between conveyors, as seen in FIG. 13, the portions of the yarn strands extending around the rake tines slip off the tines to be caught on corresponding hooks aligned with the tines. The carriage moves in a straight line between conveyors. The motion of the conveyors and rakes in a direction perpendicular to the direction of travel of the carriage cause the portions of the strands which are looped around the rake tines to extend from the carriage at an angle which decreases with increasing movement of the carriage. As previously mentioned, the stands slip off the tines when the carriage has travelled 10% of the distance between conveyors. During this time, and until the dropoff of the strands from the tines, the rake moves synchronously with the conveyor so that the tines 1", 2", 3", 4" and 5" will still be aligned with hooks 6', 7', 8', 9' and 10' respectively.

It is important that tines 1", 2", 3", 4" and 5" are aligned with hooks 6', 7', 8', 9' and 10' respectively while the strands slip off the ends of the tines. When the carriage reaches the conveyor 22, the strands $a$, $b$, $c$, $d$ and $e$ must be inserted in front of hooks 6, 7, 8, 9 and 10 respectively and behind the tines 1''', 2''', 3''', 4''', 5''' respectively of the rake which is associated with conveyor 22. The strands must be inserted behind respective tines if the strands are to be shifted to the next set of hooks on the conveyor. This is only possible if the rake has gained the distance of one hook spacing relative to the conveyor so that tines 1''', 2''', 3''', 4''', and 5''' are aligned with hooks 5, 6, 7, 8 and 9 respectively. This gain occurs during the time interval T2 to T3 when the rake moves forwardly a distance of two hooks spaces while the conveyor moves forwardly a distance of one hook spacing. This phase of operation occurs as the follower 176 moves along section C of cam 174. This section of the cam moves the rake forwardly at a faster rate than the conveyor so that the rake gains one hook spacing during the T2 to T3 interval as represented by segment C of line 179 in FIG. 20.

After having gained one hook spacing with respect to the conveyor, the rake then moves synchronously with the conveyor between T3 and T5. This motion of the rake occurs as follower 176 moves along section D of cam 174. This motion is represented by segment C of line 179 which indicates no motion of the rake with respect to the conveyor. The portions C and D of the rake movement occur between FIGS. 13 and 14. The rake will be far enough forward so that the strands $a$, $b$, $c$, $d$ and $e$ will be laid behind tines 1''', 2''', 3''', 4''' and 5''' of the rake as the carriage passes over the left-hand conveyor as shown in FIG. 14. FIG. 9 is comparable to FIG. 14 except that they represent strand inserting operations on opposite conveyors. It should now be clear how the rake as shown in FIG. 9 was far enough forward so that the strands could be laid behind respective tines of the rake as previously described.

Between FIG. 14 and FIG. 15 the rake begins its rearward stroke as represented by line segment A at T5 in FIG. 20. In FIG. 14, the rake tines 1''', 2''', 3''', 4''' and 5''' are aligned with hooks 6, 7, 8, 9 and 10 respectively. The phase of operation represented by FIG. 15 is equivalent to that shown in FIG. 10.

As seen in FIG. 15, the strands $a$, $b$, $c$, $d$ and $e$ extend from the back of hooks 1, 2, 3, 4 and 5 respectively to and around the front of hooks 1', 2', 3', 4' and 5' respectively for a first band of parallel strands. The strands $a$, $b$, $c$, $d$ and $e$ then extend down to and around the back of hooks 6', 7', 8', 9' and 10' respectively and then across to and around the front of hooks 6, 7, 8, 9 and 10 respectively to form a second band of strands which are parallel to each other and to the strands in the first band. The strands will therefore always extend from the back side of hooks on one conveyor to the front side of hooks on the other conveyor alternately. The strands of one band will be at a very slight angle to the strands of adjacent bands because of the filling hooks. This difference is slight because the thickness of the hooks is relatively insignificant in comparison to the spacing between conveyor hooks.

The invention is not limited to number of strands shown or the exact time sequence depicted for each phase of operation. As long as the various mechanisms shown are in their proper relationship at the critical phases of operation, the exact amount of time devoted to each operation is not critical. An entire strand laying operation is divided into fifths to match the number of strands shown in the drawings. Each phase of operation, as depicted by segments A, B, C, and D of FIG. 20 may in practice constitute a greater or lesser proportion of the whole operation than that shown.

(E) Adaptation of strand supplying mechanism to a warp knitting machine (1) General discussion.—When it is desired to present the parallel strands, arranged according to the present invention, for incorporation into a knitted fabric, special adaptations are required. To produce uniformity in the resulting knitted fabric it is essential that each course of knitting loops be formed around one strand at a time. To insure that this will happen, the spaces between hooks on the conveyors must be at a greater distance apart than the loop lengths formed by the knitting apparatus. This can be accomplished by varying either the hook spacings or the lengths of the knitting loops, depending on the fabric density which is desired.

Since the knitting loops are shorter than the hook spacings, the conveyors advance the strands toward the knitting station at a faster rate than that at which the fabric is taken up. The strands must be cut or otherwise released just prior to incorporation into the knitted fabric and held until after they are securely held by the knitting loops. Means are therefore provided for releasing and holding the ends of the strands in association with the knitting apparatus. Strand assist means for further insuring uniformity of strand insertion are also provided.

Figure 5:
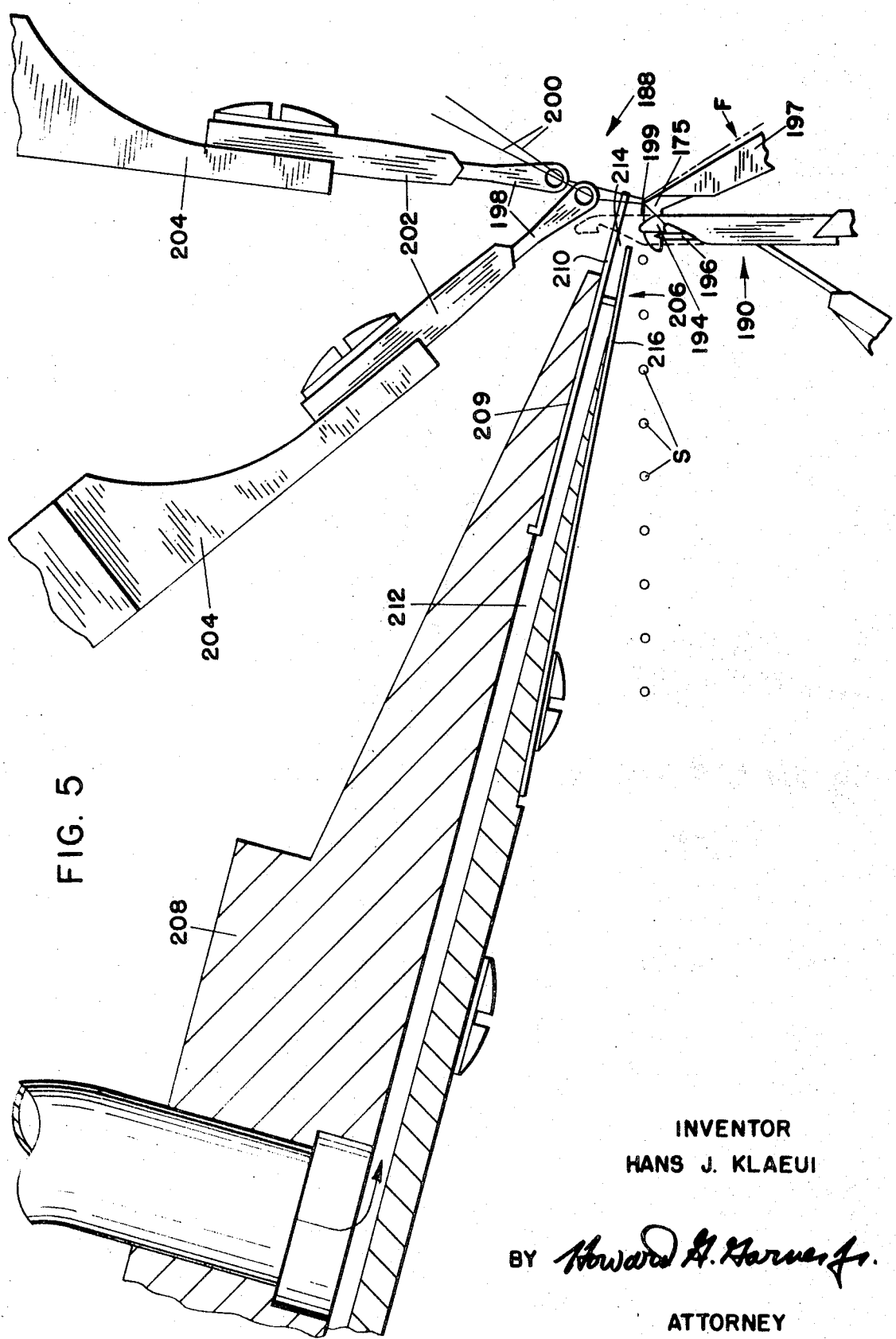
FIG. 5 is an enlarged cross section of the knitting area and strand presenting means.

(2) Knitting apparatus.—Referring particularly to FIGS. 1 and 5, there is shown a knitting station generally indicated at 188. The knitting station includes a row of knitting needles, generally indicated at 190, which extend upwardly from a housing 192 containing needle operating mechanisms, not shown but well understood in the art. The needles 190 are of the sliding latch type as disclosed in Mauersberger, supra, and include a hook 194 for engaging the strands. Each needle also includes a sliding latch 196 slidable in a suitable groove within the needle body, for closing the hook when a strand is inserted therein. The needles move upwardly between spaced trick plates 175 which extend from a support plate 197. Operated in synchronism with the loop-forming knitting needles 190 are yarn guides 198 which are supplied with stitching yarns 200. The guides 198 serve to insert yarn into the hooks 194 of the needles. The guides 198 are supported in holders 202 which are in turn fastened to a pair of guide bars 204. When the knitting needles move to their upper position as indicated in dotted lines in FIG. 5, one set of guides 198 will insert knitting yarns in respective hooks of the knitting needles. The guides may be operated in a manner disclosed in Mauersberger, supra. Mauersberger uses only one guide bar but two or more may be used in manner well known in multibar warp knitting machines. When the knitting needles are in their upper position, the latches 196 are down with respect to the needle hooks so that knitting yarns can be inserted into the hooks.

When the knitting needles move down, each needle pulls its respective yarn through a previous loop on the needle. The previous loop is cast off and the yarn which is pulled down forms a new loop. This is a normal knitting sequence and is illustrated in FIGS. 16–19.

(3) Operation of knitting apparatus.—Referring to FIG. 16, the knitting needles are shown in their lower position. The leading strand s' has advanced far enough to the right and is located against the knitting yarns which extend from the needles to the guides 198. The knitting yarns are indicated at Y. The needles will pass to the left of the strands as they are moved upwardly between elements 210 as shown in FIG. 17. While the needles are in their upper position as shown in FIG. 18, the guides 198 wrap their respective knitting yarns into the hooks 194 of respective knitting needles. When the knitting needles move downward again, each needle pulls its respective yarn down through the previously formed loop L encircling the knitting needle to form a new loop L'. Toward the end of its downward motion, the knitting needle casts off the loop L as shown in FIG. 19. On the next upward motion, the knitting needle will pass through loop L' in a manner shown in FIG. 16 to begin a new cycle. As shown in FIGS. 16–19, each knitting loop is formed around a strand S which thereby forms part of the knitted fabric indicated at F. The fabric is drawn over plate 197 at an angle and is snubbed at point 199 so that it does not slip back.

(4) Strand holding and disengaging means.—Since the spacing between holding elements on the conveyors is greater than the knitting loop lengths to insure uniformity of fabric production, the conveyors must advance toward the knitting needles at a greater speed than that at which fabric is taken up. This means that the strands must be disengaged from the conveyors as they are bound into the fabric by the knitting loops. The ends of the strand lengths must also be held securely until the lengths are firmly held by the knitting loops.

The strand lengths are disengaged by cutters 218 located adjacent to the knitting needles, see FIGS. 1 and 2. The ends of the strands are held by a holding wheel 220 associated with each conveyor, see also FIG. 6, each of which is rotatably mounted at 221 on a bracket 222 fixed to previously described conveyor supporting bracket 70. Wheel 220 is made of a friction material such as rubber or the like and is disposed on bracket 222 in such a way that its outer periphery fits snugly into the inner corners 224 of hooks 74. The outer periphery of wheel 220 is shaped so as to conform to the configuration of corners 224. As the strands approach the row of knitting needles, wheels 220 pinch both ends of the strands against their respective hooks. As each strand length is cut, the portion of the strand which extends to the next band will be held by wheels 220 until the corresponding length of that strand in the next band is securely incorporated into the fabric.

Having described my invention, it will be apparent to those skilled in the art that modifications could be made to certain structures and operations of the invention without departing from the true scope and spirit of my invention. When it is specified that strand lengths are inserted between respective hooks on the conveyors, it is not intended that a single fibrous element represent the strand length. Two or more yarns or threads or other material could constitute a strand length. Selective strands may be of diverse characteristics such as color, texture, etc. for patterning effects. It is intended that "strand lengths" extending between holding elements be separated from and parallel to similar strand lengths or even dissimilar strand lengths. For example: one yarn between a first and second hook, two yarns between the second and third hooks, three yarns between the third and fourth hooks and then one yarn between the fourth and fifth hooks. In the adaption of the invention to a knitting machine, the numbers of strand lengths per knitting course can also be varied by modifying the rate at which the knitting needles operate relative to the conveyor speed. The loops in a knitting course would all enclose the same strand. The adjacent strand would also be enclosed by all the yarns of another knitting course but there may be one or more knitting courses between strands.

(5) Strand assist means.—Referring particularly to FIG. 5, there is shown a strand assist means, generally indicated at 206, located above the conveyors. The strand assist means includes a supporting bracket 208 from which extends a comb-like structure 209 having teeth elements 210. An air passageway 212 is formed in bracket 208 through which compressed air is supplied. Passageway 212 leads to an opening 214 adjacent to the needle 190. The mouth of opening 214 is formed by the comblike structure 209 on the top and a plate 216 on the bottom. The spacing between plate 216 and the vertical line of travel of the knitting needles is less than the spacings between parallel strands, indicated at S, supplied to the knitting needles by the conveyors 20 and 22.

The conveyors and the knitting needles are timed so that the strands S are to the right of the knitting needles as they move upwardly as shown in FIG. 16. The strand assist means insures that the strand is reliably to the right of the knitting needles throughout its length when the needles move upwardly.

What is claimed and desired to be secured by Letters Patent of the United States is:

1. A knitting machine for producing a fabric composed of a system of parallel filling strands and chains of warp thread loops enmeshing and interconnecting said filling strands comprising:

(a) a pair of laterally spaced, substantially parallel, synchronously driven conveyors being provided at their adjacent edges with a plurality of holding elements adapted for holding said strands;

(b) a carriage disposed above said conveyors for reciprocation in a path perpendicular to, and intersecting with, the paths of said conveyors to extend a band of spaced strands from the holding elements on one conveyor to the holding elements on the other of said conveyors;

(c) means associated with each of said conveyors for disposing a portion of each of said strands from a first holding element to a second holding element on said conveyor spaced one band width away from said first holding element;

(d) drive means for driving said conveyors, said carriage and said disposing means wherein said conveyors each move a distance of one band width for each passage of said carriage across said conveyors and wherein said disposing means disposes each of said strands from said first holding elements to said second holding elements during a portion of said carriage passage;

(e) knitting means for forming chains of knitting loops around said parallel strands; and (f) means for disengaging said strands from said holding elements.

2. The knitting machine as described in claim 1 wherein said holding elements are hooks, each of which comprise an upwardly extending portion.

3. The knitting machine as described in claim 2 wherein each of said disposing means is a rake having a plurality of tines which extend above said hooks.

4. The knitting machine as described in claim 3 wherein said tines are aligned with respective hooks on each of said conveyors during the phase of said carriage travel during which said carriage moves past and to the outside of said hooks for extending said strands between respective tines and hooks, said drive means operating said rake so that said tines will be aligned with said second hooks before said carriage moves past said hooks toward the other of said conveyors.

5. The knitting machine as described in claim 1 wherein each of said tines has a depending portion for guiding strands between said hooks, each of said depending portions extending down to the outside of and below the upper limit of said upwardly extending hook portions.

6. A knitting machine as described in claim 1 wherein said knitting means includes a row of knitting needles located in the path of said conveyors disposed perpendicular to the direction of travel of said conveyors, said machine also including drive means for operating said knitting needles, said drive means being operatively connected to said row of conveyors for causing said row of knitting needles to form a course of knitting loops around each of said parallel strand lengths.

7. A knitting machine as described in claim 6, wherein said knitting needles are operated to form knitting loops which are shorter than the distance between said holding elements and wherein said strand lentghs are conveyed to said row of knitting needles at a faster rate than the rate at which said fabric is formed, said knitting machine further comprising:

(a) means for releasing each of said parallel lengths of strands from its respective holding elements immediately after formation of a course of knitting loops around said length of strand; and (b) retaining means for holding the end of each length of said strand extending to the subsequent strand length until said subsequent strand length is securely enmeshed by said knitting loops.

8. A knitting machine as described in claim 7, wherein said releasing means comprises cutters for cutting both ends of each length of filling yarn adjacent said holding elements and wherein said holding means comprises a friction wheel for holding each of said cut ends against said holding elements.

9. A knitting machine as described in claim 7, wherein said knitting machine further comprises strand assist means for directing fluid against each of said lengths of filling yarn in a direction generally toward said row of knitting needles as each of said lengths approaches said row, said assist means having orifice means situated behind and at a distance from said row which is less than the spacing between said holding elements.

10. A knitting machine as described in claim 6, and further comprising strand assist means including orifice means for directing fluid against each of said lengths of strands in a direction generally toward said row of knitting needles as each of said lengths approaches said row, said orifice means being situated behind and at a distance from said row which is less than the spacing between conveyed lengths of said strands.

11. A knitting machine for producing a fabric composed of a system of parallel filling strands and knitted chains of warp thread loops enmeshing and interconnecting said filling yarns comprising:

(a) a row of knitting needles for producing knitted chains of warp thread loops;

(b) a pair of parallel spaced conveyors traveling in a direction perpendicular to said row of knitting needles for presenting strands engaged thereon to said row of knitting needles;

(c) means for engaging a plurality of continuous parallel strands between said pairs of conveyors, said strands being deposited in bands wherein a portion of each of said strands extends between adjacent bands;

(d) means for releasing said lengths from engagement with said conveyors immediately after being presented to said knitting needles; and (e) retaining means for holding the portion of each strand extending between bands upon release of each length of said strand from said conveyors.

12. A knitting machine as described in claim 11, wherein the spacing between said filling lengths conveyed to said row of knitting needles is greater than the length of each knitted loop in said chains and said lengths of strands are conveyed toward said knitting needles at a faster rate than that at which said fabric is formed, said knitting machine comprising:

(a) drive means operatively connecting said knitting needles and said conveyors for conveying said lengths of filling yarn toward said knitting needles at a rate equal to one filling yarn length per knitting course; and (b) means for presenting said filling lengths one at a time from said conveyors to said knitting needles for forming a course of knitting loops around each length of filling yarn.

13. A knitting machine as described in claim 1 wherein said knitting means includes a support plate in front of the needles for guiding said fabric as it comes from said knitting needles, said plate having a plurality of trick plates which are interspaced between the paths of the knitting needles, said trick plates extending from said support plate at an angle to form an edge for snubbing said fabric and preventing it from slipping back towards said needles.

14. A knitting machine for producing a fabric composed of a system of parallel filling strands and chains of wrap thread loops enmeshing and interconnecting said filling strands comprising:

(a) a pair of laterally spaced, substantially parallel, synchronously driven conveyors being provided at their adjacent edges with a plurality of holding elements adapted for holding a plurality of said strands;

(b) means for extending parallel bands of continuous spaced parallel strands alternately from the holding elements on one conveyor to the holding elements of the other of said conveyors;

(c) drive means for driving said conveyors and said extending means continuously wherein said conveyors each move a distance of one band width for each extension of a band of strands from one conveyor to the other;

(d) knitting means for forming chains of knitting loops around said parallel strands; and (e) means for disengaging said strands from said holding elements.

References Cited

UNITED STATES PATENTS

| | | | |
|---|---|---|---|
| 2,743,596 | 5/1956 | Noe | 66—84 |
| 3,364,701 | 1/1968 | Carman | 66—84 |
| 3,440,840 | 4/1969 | Frenzel | 66—84 |
| 1,895,293 | 1/1933 | Morton (A) | 66—85 |
| 1,924,649 | 8/1933 | Morton (B) | 66—85 |
| 1,931,179 | 10/1933 | Coombes | 66—85 |
| 2,000,643 | 5/1935 | Morton (C) | 66—85 |
| 3,340,584 | 9/1967 | Kalwaites | 28—1 |
| 3,390,439 | 7/1968 | Kalwaites | 28—1 |
| 3,446,038 | 5/1969 | Inui | 66—84 |

RONALD FELDBAUM, Primary Examiner

U.S. Cl. X.R.

28—1